United States Patent [19]

Farmer

[11] Patent Number: 5,088,680

[45] Date of Patent: Feb. 18, 1992

[54] WEIGHTED SIGN BASE

[76] Inventor: Kenneth R. Farmer, 2397 Church Rd., Smyrna, Ga. 30080

[21] Appl. No.: 667,488

[22] Filed: Mar. 11, 1991

[51] Int. Cl.$^5$ .......................................... F16M 13/00
[52] U.S. Cl. .................................. 248/523; 248/158; 248/910
[58] Field of Search ............... 248/346, 158, 910, 519, 248/523, 524; 40/606, 608; 116/63 R, 63 P; 404/9; 52/98

[56] References Cited

U.S. PATENT DOCUMENTS

| | | | |
|---|---|---|---|
| 1,986,140 | 1/1935 | Dapp | 248/910 X |
| 3,119,588 | 1/1964 | Keats . | |
| 3,415,475 | 12/1968 | Goodman | 248/158 |
| 3,499,413 | 3/1970 | Heard | 248/158 X |
| 3,554,473 | 1/1971 | Rakov et al. . | |
| 3,699,712 | 10/1972 | Handler | 248/346 X |
| 4,019,271 | 4/1977 | Latimer | 116/63 P X |
| 4,591,126 | 5/1986 | Berney . | |
| 4,660,310 | 4/1987 | Farmer . | |
| 4,710,053 | 12/1987 | Kulp | 404/9 |
| 4,889,067 | 12/1989 | Provence | 40/608 |

FOREIGN PATENT DOCUMENTS 994741  8/1976  Canada ............................... 248/158

*Primary Examiner*—J. Franklin Foss
*Attorney, Agent, or Firm*—Wigman & Cohen

[57] ABSTRACT

A weighted sign base for supporting real estate signs and the like, especially signs that are provided with a pair of posts, is disclosed. The weighted sign base is formed in a generally truncated conical shape having a hollow interior adapted to be filled with a fluent material to provide weight, such as water or sand. A rectangular opening is provided in a central web portion of the base which functions as a handle for lifting and carrying the sign base.

16 Claims, 1 Drawing Sheet

WEIGHTED SIGN BASE

FIELD OF THE INVENTION

The present invention relates to new and useful improvements in devices which support signs, and more particularly, to sign supporting bases that are weighted.

DESCRIPTION OF THE PRIOR ART

In the real estate industry, there is a well known need to display signs on a temporary basis. Such signs must be light weight and easy to install in the field, especially by persons with limited experience. Because the majority of real estate signs are typically placed in residential areas on lawns, most comprise one or two posts having pointed ends which enable the posts to be driven into the ground. U.S. Pat. No. 4,660,310 to the present inventor is exemplarly of this type of sign. However, in areas where the ground is particularly hard or is frozen, these signs are difficult to install. Additionally, these signs cannot be installed on paved surfaces, such as concrete or asphalt, as might be required, for example, when an apartment or condominium in an urban area is placed on the real estate market. Accordingly, a need has arisen for means to enable signs such as the type disclosed in U.S. Pat. No. 4,660,310 to be installed on hard or frozen ground or other hard or paved surfaces.

There exists in the art many sign bases adapted to rest on the ground surface and to receive and support a sign post. In order to provide stability, several of these sign bases define a cavity which can be filled with a ballasting material. Representative of such devices are U.S. Pat. Nos. 3,415,475 to Goodman; 4,591,126 to Berney; 3,119,588 to Keats; and 3,554,473 to Rakov et al. Each of the above patents discloses a sign base comprising a hollow shell capable of being ballasted with a fluent weighting material, such as water, sand or the like.

One disadvantage of the sign base devices disclosed in the aforesaid patents to Goodman, Berney, and Keats and the prior art in general, is that the post is typically secured to the base by means of a threaded connection. This complicates assembly, especially in the field. Also, the threaded connection is susceptible to corrosion and wear which could render the device inoperative. A threaded coupling means also increases the complexity and cost of the device. Still another disadvantage of those prior art sign bases is that a plurality of parts are required to assemble the sign.

The sign base disclosed in the above Rakov et al. patent has an open-ended container for the fluent weighting material so that the container must be maintained upright to prevent spillage of the weighting material.

None of the above-described sign base devices is capable of supporting a sign having a pair of pointed posts as disclosed in the aforesaid U.S. Pat. No. 4,660,310. Another disadvantage of the prior art devices is the absence of a suitable means to aid the user in lifting and transporting the device. Occasionally, the support bases must be carried some distance after being filled with a weighting material, as, for example, in the case where a sign is to be positioned at a distance from the source of filling material. In such cases, a convenient means for grasping the base is needed.

SUMMARY OF THE INVENTION

In view of the foregoing, it should be apparent that a need still exists in the art for a sign base for supporting real estate signs and the like, especially signs that are provided with a pair of support posts, where frozen ground, hard soil, concrete or other hard or paved surfaces preclude direct insertion of the sign posts into the ground.

Accordingly, it is a primary object of this invention to provide a sign base which is effective in stabilizing signs but which is nevertheless portable, easy to install, lift, and carry.

Another object of this invention is to provide a sign base wherein the sign may be removably mounted to the base without threading or similar attachment apparatus.

Yet another object of the invention is to provide a device of the aforesaid type which is inexpensive to manufacture.

Still another object of the invention is to provide a one-piece unitary sign base that is made by molding a plastic material.

These and other objects and advantages that may become apparent hereinafter are accomplished in accordance with the present invention by providing a sign base formed in a generally truncated conical shape and having a hollow interior adapted to be filled with a fluent material to provide weight, such as water or sand. A fill opening is provided, preferably in a lower surface thereof, which may be closed with a snap-on plug. A pair of spaced parallel and coplanar slots are provided in the upper portion and are adapted to receive and retain the sign posts. A rectangular opening is provided in a central web portion of the base which functions as a handle for lifting and carrying the sign base.

Advantageously, the sign base is manufactured in one-piece by rotationally molding a plastic material, such as polypropylene, in a mold. Such a unitary construction eliminates the need to assemble the sign base, except for inserting the snap-on plug after filling the base.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF A PREFERRED EMBODIMENT

Figure 1:
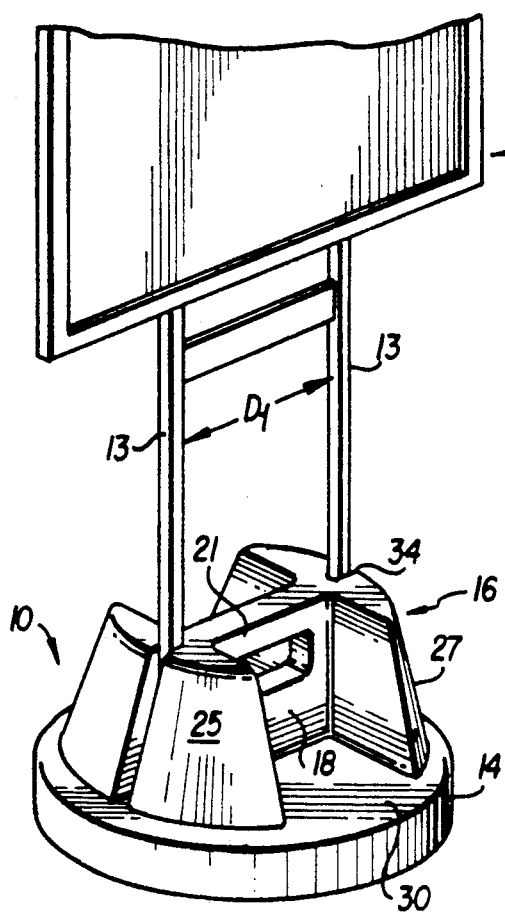
FIG. 1 is a perspective view of the sign supporting base of the present invention shown supporting a sign.
Figure 4:
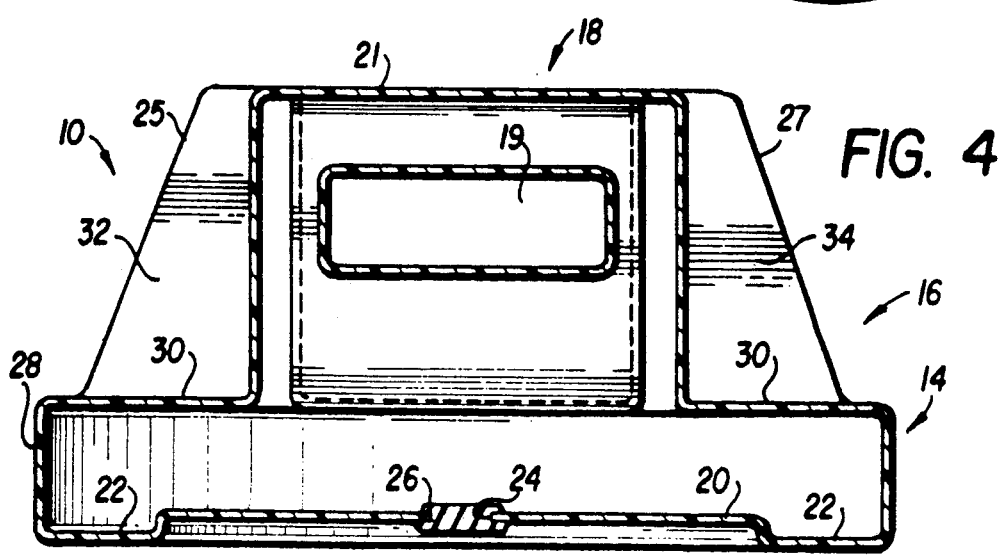
FIG. 4 is an enlarged cross-sectional view taken along line 4—4 of FIG. 2.

Referring now in detail to the drawings wherein like parts are designated by like reference numerals throughout, there is illustrated in FIG. 1 a perspective view of the base of the present invention designated generally by reference numeral 10 shown supporting a sign 12 having a pair of posts 13 which may be made of round or square rod. Base 10 is formed by rotationally molding a polypropylene plastic material and has a hollow interior or cavity as best seen in FIG. 4. Base 10 generally comprises three integrally formed sections, namely, a cylindrical disk-like platform 14, an upper, generally truncated conical portion 16, and a central web portion 18.

In particular, and with reference to FIG. 4, platform 14 comprises a generally planar recessed lower surface 20 having an annular ring portion 22 extending downwardly from surface 20 for contacting the surface on which the base 10 is placed. A fill hole or opening 24 is provided in the center of surface 20 so that the interior cavity may be filled with water, sand or the like to add weight to the base 10. A snap-in plug 26 is provided to close opening 24. The construction of the platform 14 with the recessed surface 20 provides good stability to the base and provides clearance for the snap-in plug 26 when the base is resting on a support surface. The platform 14 also comprises an upper surface generally parallel to lower surface 20 and a cylindrical wall 28 connecting the upper surface 30 with the annular portion 22.

Extending upwardly from platform 14 and integrally formed therewith is upper portion 16. Upper portion 16 is shaped like a truncated cone with a central portion removed and comprises first and second post supporting portions 25, 27. Web portion 18 is disposed between first and second post supporting portions 25, 27 and comprises a double-walled central portion with a generally rectangular opening 19 located approximately one inch below the upper surface of web portion 18. Opening 19 thus provides the central web portion 18 with a hollow handle means 21 at the top of the web portion. The hollow handle means 21 also has a substantially rectangular cross-section similar to that of a square tube. It is a particular feature of the present invention that the built-in handle means 21 advantageously permits the user to lift and transport the sign base device whether it is empty or filled with ballast material.

Figure 2:
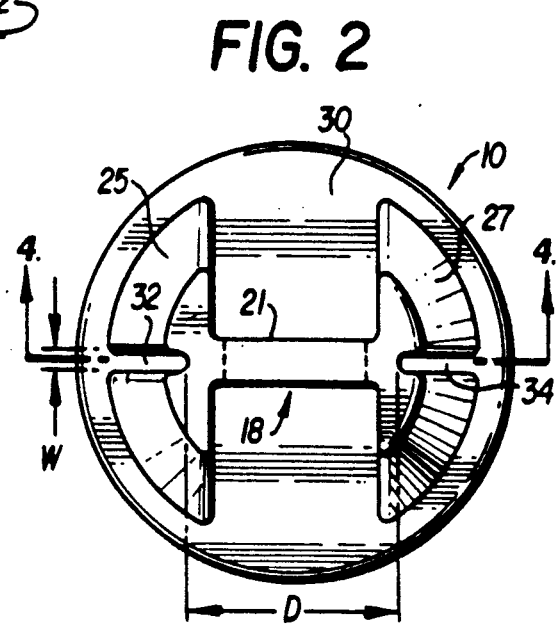
FIG. 2 is a top plan view of the sign supporting base of the present invention.
Figure 3:
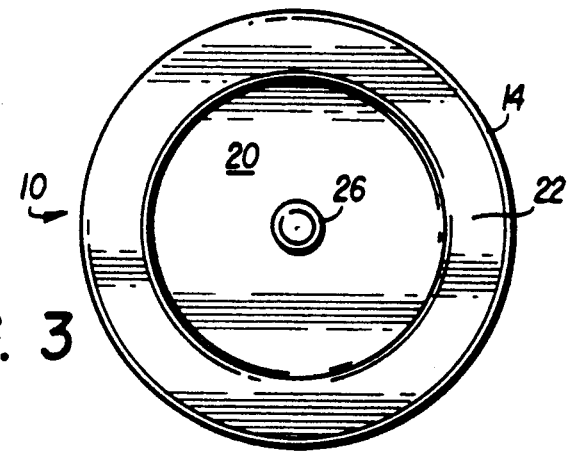
FIG. 3 is a bottom plan view of the sign supporting base of the present invention.

A pair of generally parallel and coplanar slots 32 and 34 are disposed in truncated portions 25 and 27 as best viewed in FIG. 2 for receiving the posts 13 of sign 12. Slots 32 and 34 extend from the top of upper portion 16 to the top surface 30 of platform 14. The distance D (FIG. 2) between slots 32 and 34 preferably corresponds to the distance $D_1$ (FIG. 1) between posts 13 of sign 12. Similarly, the width W (FIG. 2) of slots 32 and 34 is approximately the same as the diameter or width of posts 13 thereby resulting in a relatively tight friction fit between the sign 12 and base 10. Hence, when posts 13 are inserted into the slots 32, 34 each post is securely gripped in a tilt-free manner between the walls of slots 32 and 34.

In operation, the user inverts the base 10 and removes plug 26. A ballasting material such as water, sand, or other fluent ballasting material is poured into the hollow interior of the base 10 via opening 24 and plug 26 is reinserted into the opening. Base 10 is then righted and may be lifted by handle means 21 and carried along with sign 12 to a desired location. The base is placed on a support surface and the posts 13 of sign 12 are inserted into the slots 32, 34 of base 10.

While the present invention has been described as particularly useful for real estate signs, especially those with a pair of pointed posts, the sign base of the invention may be used to support other types of signs and may be configured to support a sign with a single post. In addition, the sign base of the invention may be made by other plastic molding techniques using other suitable types of plastics, such as polyethylene.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A base for supporting a sign having at least two spaced posts, said base being formed as one unitary part of a resilient material, said base part having a wall defining an interior cavity for containing a fluent ballast material, means in the wall of said base part for filing the cavity with the ballast material, means on said base part for gripping said posts and means on said base part defining a handle adapted to be grasped with a hand for lifting and transporting the sign base, said post gripping means comprising a pair of slots in said base part, each of said slots frictionally engaging a respective one of said two posts and supporting the sign.

2. The sign base of claim 1, wherein said filling means is an opening and including means for plugging the opening.

3. The sign base of claim 1, wherein said handle defining means comprises a web portion of said base part said web portion having an opening therethrough defining the handle.

4. The sign base of claim 3, wherein said web portion is a double-walled central portion of the base part and said opening is a generally rectangular opening extending through both walls of the web portion.

5. The sign base of claim 1, wherein said base part comprises a platform portion, an upstanding portion extending above the platform portion, said upstanding portion defining the gripping means for the post and the handle defining means.

6. The sign base of claim 5, wherein said handle defining means comprises an opening through said upstanding portion.

7. The sign base of claim 6, wherein said upstanding portion comprises a pair of truncated portions connected by a central web portion, one of said slots being disposed in each of said truncated portions and the handle defining opening being disposed through said central web portion.

8. The sign base of claim 7, wherein said truncated portions have generally conical surfaces.

9. The sign base of claim 1, wherein the base part is a one piece polypropylene plastic molding.

10. The sign base of claim 5, wherein said platform portion comprises a cylindrical platform with an annular bottom surface and a recessed central planar portion, the filling means comprising a fill opening in the central planar portion and plug means for sealing the fill opening.

11. A base for supporting a sign having a pair of posts comprising a hollow base part formed in one-piece of a resilient material and adapted to be filled with a fluent ballast, said base part comprising a platform portion and an upper portion, a pair of radial slots in said upper portion for grippingly receiving a respective one of the posts of the sign, said upper portion comprising first and second upper portions, a web portion connecting the upper portions, said web portion having an opening therethrough defining a handle means for grasping and lifting the base.

12. The base of claim 11, wherein said first and second upper portion comprise sections of a truncated cone, said opening comprising a generally rectangular opening.

13. The base of claim 11, wherein said platform portion has an opening means therein communicating with the hollow interior of the base part for filling the base part with the fluent ballast, and means for plugging the opening means.

14. The base of claim 13, wherein said plug means is recessed in the platform portion.

15. The base of claim 11, wherein said web portion has a double wall, the handle defining opening extending through both walls of the web portion, said opening being generally rectangular and forming a hollow handle having a substantially rectangular cross-section.

16. The base of claim 11, wherein said radial slots are substantially coplanar.

* * * * *